(12) United States Patent
Charreyron et al.

(10) Patent No.: US 11,590,807 B2
(45) Date of Patent: Feb. 28, 2023

(54) METHOD FOR THE DETECTION OF A CHANGE IN THE ROLLING RADIUS OF A TIRE, AND ASSOCIATED MONITORING

(71) Applicant: COMPAGNIE GENERALE DES ETABLISSEMENTS MICHELIN, Clermont-Ferrand (FR)

(72) Inventors: Jacques Charreyron, Clermont-Ferrand (FR); Martin Journois, Clermont-Ferrand (FR); Jacques De Giacomoni, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 148 days.

(21) Appl. No.: 16/312,391

(22) PCT Filed: Jun. 23, 2017

(86) PCT No.: PCT/FR2017/051678
§ 371 (c)(1),
(2) Date: Dec. 21, 2018

(87) PCT Pub. No.: WO2017/220945
PCT Pub. Date: Dec. 28, 2017

(65) Prior Publication Data
US 2019/0210411 A1    Jul. 11, 2019

(30) Foreign Application Priority Data

Jun. 23, 2016 (FR) .................................. 1655869

(51) Int. Cl.
*B60C 11/24* (2006.01)
*G01B 21/12* (2006.01)

(52) U.S. Cl.
CPC ............ *B60C 11/246* (2013.01); *B60C 11/24* (2013.01); *G01B 21/12* (2013.01)

(58) Field of Classification Search
CPC ........ B60C 11/246; B60C 11/24; G01B 21/12
See application file for complete search history.

(56) References Cited

U.S. PATENT DOCUMENTS

| 8,371,159 B2 | 2/2013 | Morinaga | |
|---|---|---|---|
| 2010/0186492 A1 | 7/2010 | Morinaga | |
| 2013/0259386 A1* | 10/2013 | Chandrashekar | G06K 9/4633 |
| | | | 382/203 |
| 2015/0239298 A1 | 8/2015 | Kretschmann | |

FOREIGN PATENT DOCUMENTS

| EP | 2 172 759 A1 | 4/2010 | |
|---|---|---|---|
| JP | H0939526 A * | 2/1997 | |
| WO | WO-2014195604 A1 * | 12/2014 | ........... B60C 11/246 |

OTHER PUBLICATIONS

Machine translation of WO20140195604 (Year: 2014).*
International Search Report dated Sep. 14, 2017, in corresponding PCT/FR2017/051678 (4 pages).

* cited by examiner

*Primary Examiner* — Matthew G Marini
(74) *Attorney, Agent, or Firm* — Venable LLP

(57) ABSTRACT

A method for detecting a change in the rolling radius of a tire and a method for monitoring the state of the tire are based on the analysis of signals representing an actual speed of a vehicle on which the tyre is fitted and a speed of rotation of the wheel bearing the vehicle.

6 Claims, 3 Drawing Sheets

METHOD FOR THE DETECTION OF A CHANGE IN THE ROLLING RADIUS OF A TIRE, AND ASSOCIATED MONITORING

FIELD OF THE INVENTION

The present invention lies in the field of monitoring the state of vehicle tyres. More specifically, the present invention relates to a method for detecting a change in the rolling radius of a tyre, and to a method for monitoring the state of the tyre, making it possible to order maintenance to be carried out.

As is known, the tread of a pneumatic tyre, whether it is intended to be fitted to a passenger, heavy-duty, civil engineering or other vehicle, is provided with a pattern comprising, in particular, pattern elements or elementary blocks delimited by various longitudinal, transverse or oblique main grooves, it also being possible for the elementary blocks to have various thinner incisions or sipes. The grooves form channels for draining off water when running on wet ground and define the leading edges of the pattern elements.

When a pneumatic tyre is new, the tread is at its maximum height. This initial height can vary depending on the type of pneumatic tyre in question and the use for which it is intended; for example, "winter" tyres generally have a pattern depth greater than that of "summer" tyres. When the pneumatic tyre wears down, the height of the elementary blocks of the pattern decreases and the stiffness of these elementary blocks increases. The increase in the stiffness of the elementary pattern blocks causes a reduction in some performance characteristics of the tyre, such as the grip on wet ground. In addition, the water draining capacities decrease significantly when the depth of the channels of the patterns decreases. It is therefore desirable to be able to monitor the progression of the wear of the tread of a pneumatic tyre.

Such monitoring is even more useful in the case of vehicle fleets, where the fleet manager cannot visually monitor all the vehicles and thus requires a means that allows him to obtain information relating to the state of the tyres of his entire fleet and the need for maintenance.

Several systems that allow such monitoring have been described in the past, these systems being based for example on the use of external devices that carry out wear measurements and transmit such measurements to a remote server that a fleet manager can access. However, these systems require that the vehicles pass through a specific location, which is not always possible.

Also known, from the application US2015/0239298, is a system for remedying this drawback. Specifically, that document describes a method for determining the wear of a tyre as it is being used. That method is based on the determination of a rolling radius and on the determination of a wear profile as a function of the change in this rolling radius. However, it has been found that that method did not make it possible to gain sufficiently reliable information.

Therefore, the present invention aims to provide a method for determining the state of wear of a tyre, aiming to remedy the abovementioned drawbacks.

BRIEF DESCRIPTION OF THE INVENTION

Therefore, the invention relates to a method for determining a change in a rolling radius of a tyre fitted on a vehicle, the method comprising the following steps:

A first signal representing an actual speed of the vehicle is obtained for a first period of time, A second signal representing a speed of rotation of the vehicle wheel bearing the tyre is obtained for the same period of time, The data constituting the first and the second signal are selected and processed so as to make them comparable, After the data have been selected and processed, the ratio of the first signal and the second signal is calculated in the form of a set of data, A set of statistical indicators representative of this set of data is determined, and Depending on these statistical indicators, a change in a rolling radius of a tyre is determined.

Such a method can be implemented on all types of vehicle, in particular from the group comprising: passenger vehicles, heavy-duty vehicles, civil engineering vehicles, or agricultural vehicles.

The change in the rolling radius may be due to several parameters, such as the wear of the tyre, a change in the tyre pressure, or a change in the load on the tyre.

The relationship between the wear of a tyre and the rolling radius of said tyre will be particularly valuable for tyres that have tread patterns that are deep compared with their rolling radius, since the wear of a tyre is characterized by a decrease in the height of rubber of the tread patterns. Thus, the following table shows that a method according to the invention will be particularly advantageous for vehicles of the agricultural or civil engineering type that are equipped with tyres having typical tyre radii, examples of which are shown in the following table:

| Type of tyre | Typical Tyre radius | Average height of rubber to be worn down | Ratio of height of rubber/radius |
| --- | --- | --- | --- |
| PL (Heavy-duty) | 500 | 12 | 2.4% |
| TC (Passenger car/light truck) | 300 | 7 | 2.3% |
| GC (Civil engineering) | 1500 | 100 | 6.7% |
| AV (Aircraft) | 600 | 11 | 1.8% |
| AG (Agricultural) | 600 | 60 | 10% |

In one preferred embodiment, the step of obtaining a first signal representing an actual speed of the vehicle is carried out by obtaining geolocation data of the vehicle, for example via a GPS-type system, or by obtaining data output by an accelerometer installed on the vehicle.

In another preferred embodiment, the step of obtaining a second signal representing a theoretical speed of rotation of the wheel is carried out by reading the data transmitted on a CAN bus of the vehicle or the data output by an accelerometer installed in the tyre or in the wheel bearing the tyre.

In another embodiment, the statistical indicators calculated over the set of data are contained in the group comprising: the number of points, the minimum, the maximum, the average, the standard deviation, the median and the quartiles. The choice of statistical indicators depends on the type of vehicle, but also on the manner of implementation of a method according to the invention. Specifically, such a method can be implemented either on board, that is to say using systems present on a vehicle, or not on board.

In the case of on-board implementation, use will preferably be made of the average rather than the median, since it requires less calculation power. The standard deviation makes it possible to obtain information about the precision of the method. For their part, the minimum and the maximum make it possible to reveal the outliers, and optionally not to take them into account.

In one embodiment, the step of selecting and processing the data comprises a step of smoothing the signals by way of a filter kernel, for example of the Gaussian, uniform, quadratic or exponential type. Such a choice for carrying out the smoothing step makes it possible to minimize the complexity of the invention, and thus to allow it to be implemented in a vehicle.

In another embodiment, the step of selecting and processing the data comprises a step of eliminating the data representing a speed greater than a predetermined threshold, for example set at 50 km/h. This threshold is preferably adapted to the type of vehicle on which a method according to the invention is implemented. Specifically, in the case of a civil engineering vehicle, the range of speeds of which is around 0-60 km/h, setting a threshold at 50 km/h could make a method according to the invention ineffective. In this case, a lower threshold will be set. This lower threshold does not represent a problem for a method according to the invention, since vehicles of civil engineering type take long journeys at stable speeds, making it possible to obtain signals that can be exploited.

In another embodiment, the step of selecting and processing the data comprises a step of deriving a signal. In this case, the method advantageously comprises a step of eliminating the data of the derived signal representing an acceleration less, in absolute terms, than a predetermined threshold, for example 0.05 m·s$^{-2}$.

This embodiment using the acceleration is particularly advantageous for application of a method according to the invention to vehicles of the passenger vehicle type; specifically, these vehicles sometimes have speed signals exhibiting great variations, and the use of the acceleration makes it possible to obtain stable signals. However, it has been found that a strong acceleration could lead to changes in the rolling radius. To compensate for this effect, in one exemplary embodiment, a tyre stiffness parameter is calculated.

Another aspect of the invention relates to a method for monitoring the state of a tyre, comprising the following steps:
A method according to one of the preceding claims is implemented several times,
The statistical indicators of the sets of data are saved in a memory,
The development of these statistical indicators is determined, and
Depending on this development, a need for tyre maintenance is determined.

The needs for tyre maintenance may be of a wide variety of kinds. Thus, consideration may be given to the following applications
The detection of end of life, which may require replacement of the tyre,
The detection of a pressure drop, which may require inflation of the tyre,
The detection of different wear states on several tyres of the same vehicle, which may require switching of the tyres for one another.

These different applications require the implementation of a method over long periods, ranging from a few weeks to several months. Such a duration makes it possible to ignore certain parameters such as the load carried by the vehicle, since the effect of this load is smoothed over time. This thus allows reliable implementation of a method according to the invention in vehicles of heavy-duty type, which have significant variations in load.

In the case of a civil engineering tyre, a method according to the invention is particularly suitable, since the height of rubber of the tread of a tyre is very large, and the variation in the rolling radius is thus very marked. Moreover, on this type of vehicle, the pressure of the tyres is checked precisely and regularly, and therefore has no influence on the rolling radius.

BRIEF DESCRIPTION OF THE FIGURES

Further objectives and advantages of the invention will become clearly apparent from the following description of a preferred, but non-limiting, embodiment, illustrated by the following figures, in which.

DESCRIPTION OF THE BEST EMBODIMENT OF THE INVENTION

Figure 1:
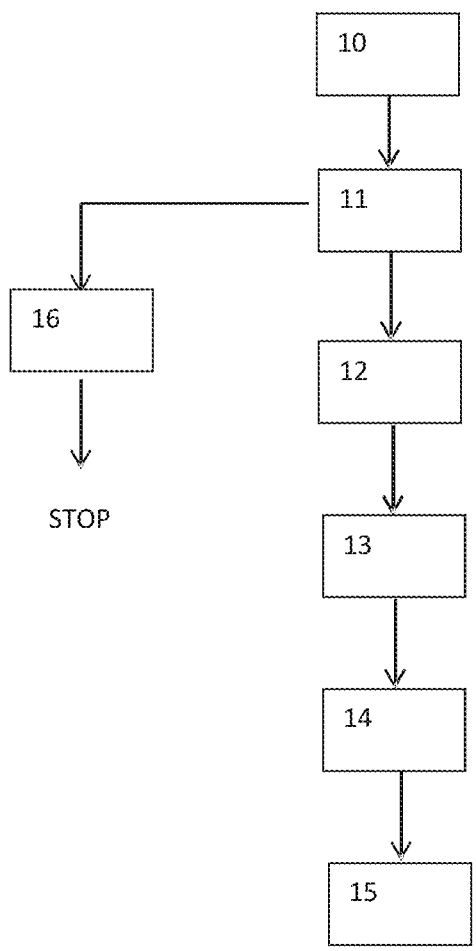
FIG. 1 shows a block diagram of a method for determining a change in rolling radius according to the invention.

The different steps in a method for determining a change in rolling radius according to the invention will now be described with the aid of FIG. 1 and of FIGS. 2a and 2b.

In block 1, a first signal representing the actual speed of the vehicle is determined, for example via GPS, and a second signal representing the theoretical speed of the wheels is determined, for example by reading the data on the CAN bus. It is emphasized here that, according to the constructors, the information available on the CAN bus differs; thus, it is sometimes not possible to obtain an individual wheel speed, but only an axle speed. In this case, a method according to the invention will make it possible to obtain information about all the tyres fitted on this axle, without being able to distinguish between tyres.

Once these data have been obtained, a step of extracting the relevant data is carried out, in block 11. This extraction consists first of all in selecting the data of the first signal for a predetermined period of time. When the signal has an insufficient number of points over this period, a method according to the invention is then interrupted (block 15). In one example, a period of time equal to one minute will be chosen, and the minimum number of points will be determined to be 50, representing an average of 0.8 points per second.

The data of the second signal are then selected for the same period of time. If the CAN signal does not comprise any points, a method according to the invention is interrupted (block 15).

Once the data have been extracted, the signals are smoothed by a Gaussian kernel. First of all, in block 12, the GPS signal is filtered in the following form:

At each instant $t_i$ of the GPS speed signal (i=1 . . . n), the smoothed value is calculated as an average of the other points:

$$\hat{v}_{GPS}(t_i) = \frac{\sum_{j=1}^{n} K(t_i - t_j) \cdot v_{GPS}(t_j)}{\sum_{j=1}^{n} K(t_i - t_j)},$$

Where $$K(dt) = e^{-\frac{dt^2}{2\sigma^2}}.$$

In matrix form, it is possible to simply write:

$$\hat{v}_{GPS} = \frac{K_{GPS} \cdot v_{GPS}}{K_{GPS} \cdot 1},$$

where $K_{GPS}$| is the matrix defined by $k_{i,j}=K(t_i-t_j)$

The CAN signal is then smoothed by a method similar to the GPS signal, by changing the parameter of scale of the filter, and it is resampled over the scale of time of the GPS signal, in order to obtain comparable data. Specifically, a GPS signal is generally at a frequency of 1 Hz, while a CAN signal is generally at a frequency of between 50 and 100 Hz.

Thus, if the instants of the CAN signal are denoted $\tilde{t}_1, \ldots, \tilde{m}$, the following calculation is made for each instant $t_i$ of the GPS signal:

$$\hat{v}_{CAN}(t_i) = \frac{\sum_{j=1}^{m} K(t_i - \tilde{t}_j) \cdot v_{GPS}(\tilde{t}_j)}{\sum_{j=1}^{n} K(t_i - \tilde{t}_j)} = \frac{K_{CAN} \cdot v_{CAN}}{K_{CAN} \cdot 1},$$

Where this time, $K_{CAN}$ is a rectangular matrix (n×m) defined by $k_{i,j}=K(t_i-\tilde{t}_j)$.

Moreover, a derivation of the CAN signal is also carried out, in order to obtain a signal representative of the acceleration of the wheels.

$$\hat{v}'_{CAN}(t_i) = \frac{\partial}{\partial t_i}\left(\frac{K_{CAN} \cdot v_{CAN}}{K_{CAN} \cdot 1}\right) = \frac{(K'_{CAN} \cdot v_{CAN})(K_{CAN} \cdot 1) - (K_{CAN} \cdot v_{CAN})(K'_{CAN} \cdot 1)}{(K_{CAN} \cdot 1)^2},$$

where $K_{CAN}'$ is the derived matrix defined by $k_{i,j}=K'(t_i-\tilde{t}_j)$.

Figure 2A:
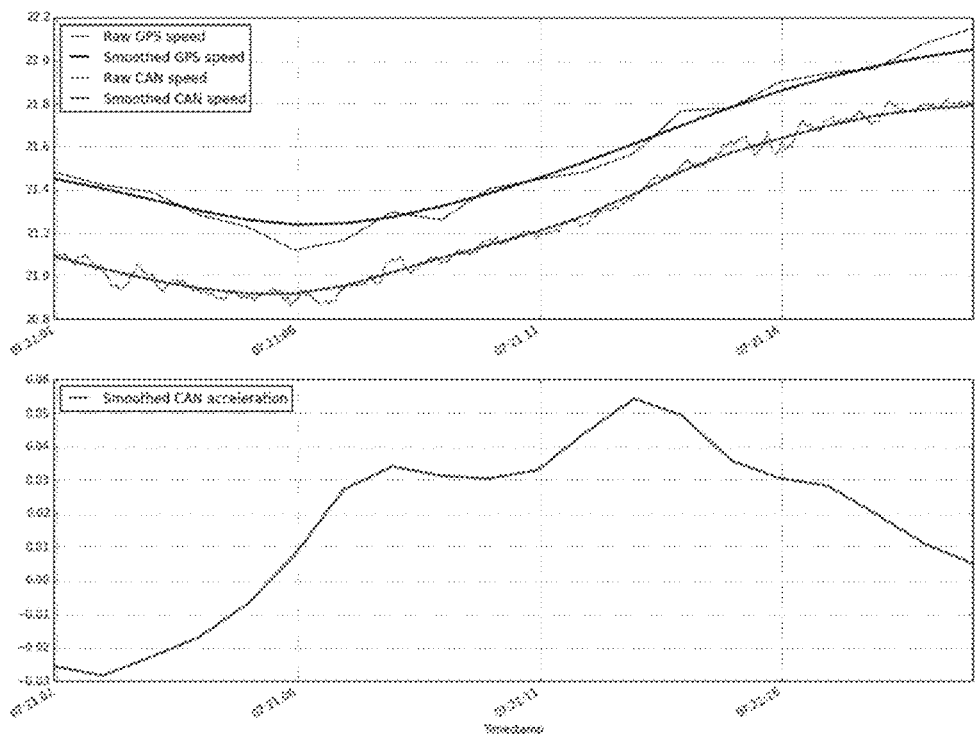
FIGS. 2a and 2b show examples of GPS and CAN signals obtained while a method for determining a change in rolling radius according to the invention is being implemented.

FIG. 2a shows the CAN and GPS signals before and after this smoothing step. Thus, the upper graph shows four curves. The two top curves represent the unsmoothed GPS speed and the smoothed GPS speed, and the two other curves represent the unsmoothed CAN speed and the smoothed CAN speed. The lower graph shows the smoothed CAN acceleration.

Once the signals have been smoothed, the signals are filtered, in block 14. To this end, the instants at which the GPS speed is greater than a predetermined speed threshold, and the instants at which the acceleration derived from the CAN speed is less, in absolute terms, than a predetermined threshold, are selected.

Figure 2B:
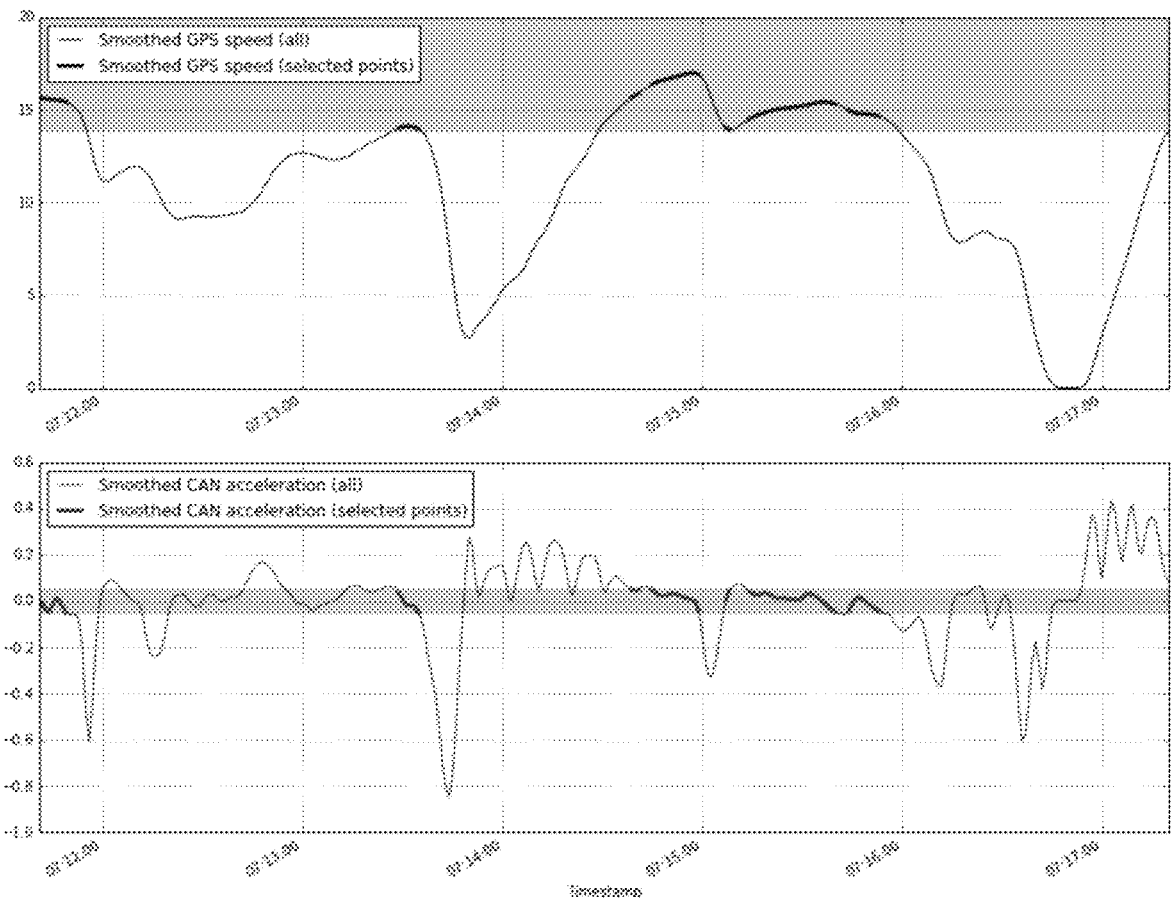

This filtering step is shown in FIG. 2b. Thus, the upper graph shows an example of smoothed GPS speed and, from among the set of points forming this signal, only those situated above 13.88 m·s$^{-1}$, that is to say those situated in the grey area, are selected.

In the same way, the lower graph shows an example of smoothed CAN acceleration and, from among the set of points forming this signal, only those situated, in absolute terms, below 0505 m·s$^{-2}$, that is to say those situated in the grey area, are selected.

Next, in block 15, the ratio $$\frac{\hat{v}_{GPS}(t_i)}{\hat{v}_{CAN}(t_i)}$$

for all the remaining points is calculated, and this set of data is then summarized by several statistical indicators already mentioned in the present application.

These statistical indicators can then be used directly or be saved in a memory for use over a long period, as described above. In this case, a selection will be made, from the set of ratios stored, in order to determine which ones will be used in the evaluation of the state of the tyre. Thus, the decision could be made that only the ratios relating to a number of points greater than a given threshold, for example 5, will be retained, in order to keep only the most representative ratios.

Figure 3:
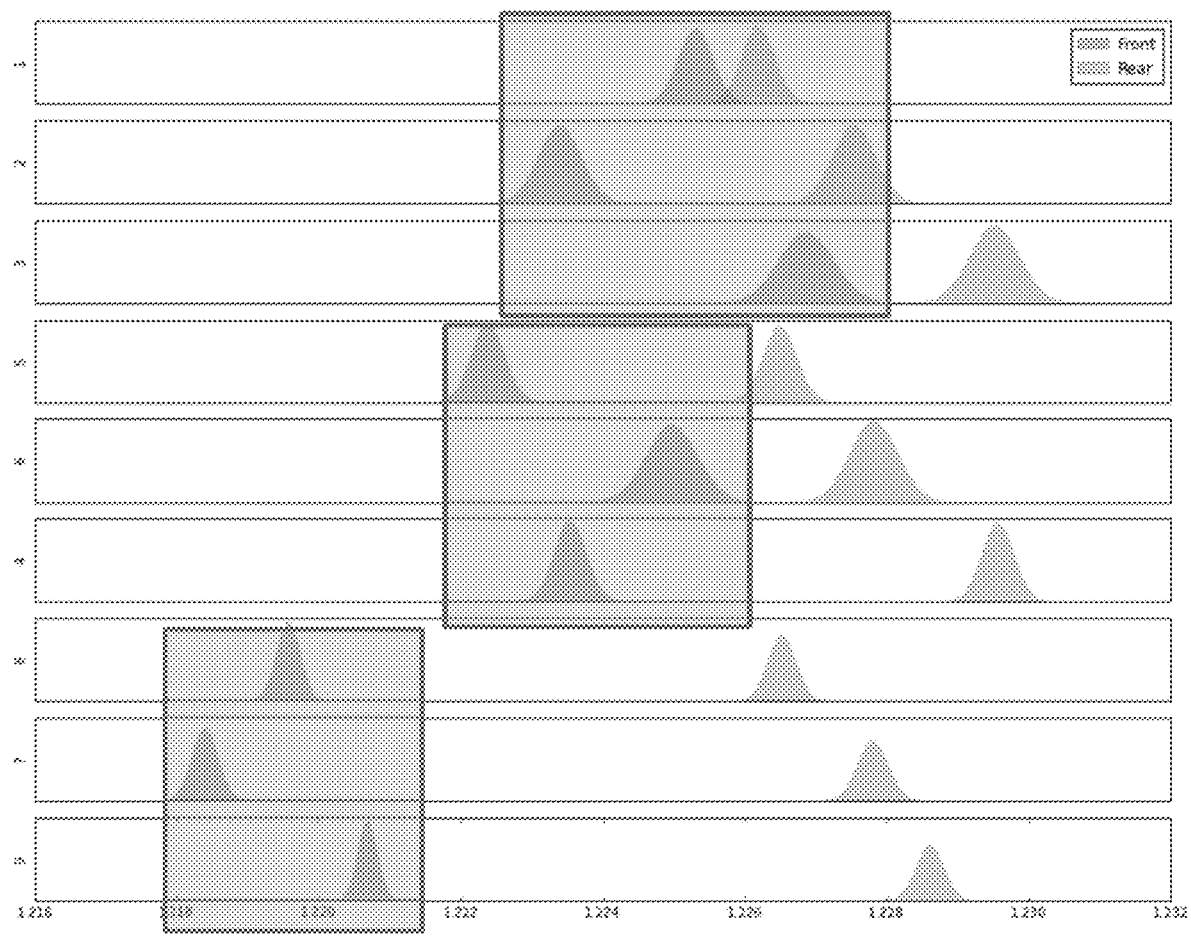
FIG. 3 shows a distribution of statistical data obtained while a method for monitoring the state of a tyre according to the invention is being implemented.

FIG. 3 shows an example of the distribution of these statistical data. Thus, in this figure, the nine diagrams respectively show the ratio Actual speed/Theoretical speed for the tyres as follows:

| No. | Wear | Load | Pressure |
|---|---|---|---|
| 1 | New | +++ | ++ |
| 2 | New | ++ | + |
| 3 | New | + | ++ |
| 4 | Average | +++ | + |
| 5 | Average | ++ | ++ |
| 6 | Average | + | + |
| 7 | Worn | +++ | ++ |
| 8 | Worn | ++ | + |
| 9 | Worn | + | ++ |

Thus, "groups" of distribution, symbolized by the three boxes drawn on these curves, are apparent. Two things are thus observed:
- The first is that the load and the pressure have a negligible influence on the positioning of the distributions, since they do not mask the effect of wear.
- The second is that the tyres can be clearly distinguished in accordance with their state of wear, since the first box groups together the new or virtually new tyres, the second box groups together the tyres with an average level of wear, and the third box groups together the worn tyres.

The invention claimed is:

1. A method for determining a change in a rolling radius of a tire fitted on a vehicle, the method comprising the steps:
   obtaining a first signal representing an actual speed of the vehicle for a first period of time by obtaining geolocation data of the vehicle;
   obtaining a second signal representing a speed of rotation of the vehicle wheel bearing the tire for the same period of time by reading data transmitted on a CAN bus of the vehicle;
   selecting and processing data constituting the first and the second signals so as to make them comparable, wherein the step of selecting and processing data comprises:

eliminating data representing a speed greater than a predetermined speed threshold;
deriving a signal; and
eliminating data of the derived signal representing an acceleration less, in absolute terms, than a predetermined acceleration threshold;
after the selecting and processing step, calculating a ratio of the first signal and the second signal in the form of a set of data;
determining a set of statistical indicators representative of the set of data; and
determining a change in the rolling radius of the tire based on the statistical indicators in order to monitor the wear of the tire.

2. The method according to claim 1, wherein the statistical indicators are selected from a number of points, a minimum, a maximum, an average, a standard deviation, a median and a quartile.

3. The method according to claim 1, wherein the step of selecting and processing the data comprises smoothing the signals using a filter kernel.

4. The method according to claim 1, wherein the predetermined speed threshold is equal to 50 km/h.

5. The method according to claim 1, wherein the predetermined acceleration threshold is equal to 0.05 m·s$^{-2}$.

6. A method for monitoring a state of a tire comprising the steps:
implementing the method according to claim 1 more than once;
saving the statistical indicators of the sets of data in a memory;
determining a development of the statistical indicators; and
determining a need for tire maintenance depending on the development.

* * * * *